(12) United States Patent
Matsuoka

(10) Patent No.: US 8,990,580 B2
(45) Date of Patent: Mar. 24, 2015

(54) AUTOMATIC USER SWAP

(75) Inventor: Yoshimichi Matsuoka, Cupertino, CA (US)

(73) Assignee: Google Inc., Mountain View, CA (US)

( * ) Notice: Subject to any disclaimer, the term of this patent is extended or adjusted under 35 U.S.C. 154(b) by 35 days.

(21) Appl. No.: 13/457,400

(22) Filed: Apr. 26, 2012

(65) Prior Publication Data

US 2013/0291093 A1  Oct. 31, 2013

(51) Int. Cl.

| | |
|---|---|
| *G06F 21/00* | (2013.01) |
| *G05B 19/00* | (2006.01) |
| *G06C 7/00* | (2006.01) |
| *G06F 11/00* | (2006.01) |
| *G06K 9/00* | (2006.01) |
| *H04L 9/32* | (2006.01) |
| *H04L 29/06* | (2006.01) |

(52) U.S. Cl.
CPC ...... *H04L 9/3231* (2013.01); *G06F 2221/2137* (2013.01); *H04L 63/0861* (2013.01)
USPC ............. 713/186; 340/5.83; 726/19; 726/25; 726/28; 382/118

(58) Field of Classification Search
CPC ... G06F 21/32; G06F 21/36; G06F 17/30793; G06K 9/00221; G06K 9/3241; G06K 9/46; G06K 9/00369; H04L 9/3231; H04L 29/06809; H04L 63/0861
See application file for complete search history.

(56) References Cited

U.S. PATENT DOCUMENTS

| | | | |
|---|---|---|---|
| 7,308,581 B1 * | 12/2007 | Geosimonian | 713/186 |
| 8,261,090 B1 * | 9/2012 | Matsuoka | 713/186 |
| 2004/0151347 A1 | 8/2004 | Wisniewski | |
| 2004/0158724 A1 | 8/2004 | Carr et al. | |
| 2006/0288234 A1 * | 12/2006 | Azar et al. | 713/186 |
| 2007/0174272 A1 | 7/2007 | Carter et al. | |
| 2008/0109895 A1 | 5/2008 | Janevski | |
| 2008/0267458 A1 | 10/2008 | Laganiere et al. | |
| 2009/0077653 A1 | 3/2009 | Osborn et al. | |
| 2009/0138405 A1 | 5/2009 | Blessing | |
| 2009/0328169 A1 | 12/2009 | Hutchison et al. | |

(Continued)

FOREIGN PATENT DOCUMENTS

| | | |
|---|---|---|
| EP | 1672460 B1 * | 11/2009 |
| EP | 1672460 B1 * | 11/2009 |
| KR | 2010-0010180 A | 2/2010 |

OTHER PUBLICATIONS

Westinghouse, Polaroid Team on Security Management System, Sep. 7, 1993, Security Technology News, v 1, n 10.

*Primary Examiner* — Andrew Nalven
*Assistant Examiner* — Quy Pham
(74) *Attorney, Agent, or Firm* — McDermott Will & Emery LLP

(57) ABSTRACT

A computer-implemented method for providing secure access to a computer is disclosed according to one aspect of the subject technology. The method comprises capturing an image with a camera at the computer, extracting facial features from the image, and comparing the extracted facial features with facial features of a user stored on the computer, wherein the computer is currently logged into a user account belonging to the user. The method also comprises, if the extracted facial features match the stored facial features of the user, then staying logged into the user account, and, if the extracted facial features do not match the stored facial features of the user, then automatically logging out of the user account.

21 Claims, 3 Drawing Sheets

(56) References Cited

U.S. PATENT DOCUMENTS

| | | |
|---|---|---|
| 2010/0132043 A1* | 5/2010 | Bjorn et al. .................... 726/25 |
| 2010/0245042 A1 | 9/2010 | Tsubaki |
| 2011/0023113 A1* | 1/2011 | Munyon et al. ................ 726/19 |
| 2011/0067098 A1 | 3/2011 | Nelson et al. |
| 2011/0157347 A1 | 6/2011 | Kalocsai |
| 2011/0206244 A1 | 8/2011 | Munoz-Bustamante |
| 2011/0252332 A1 | 10/2011 | Lee et al. |
| 2012/0235790 A1* | 9/2012 | Zhao et al. ................... 340/5.83 |
| 2013/0051632 A1* | 2/2013 | Tsai et al. .................... 382/118 |
| 2013/0128071 A1* | 5/2013 | Tzur et al. ................. 348/222.1 |

* cited by examiner

AUTOMATIC USER SWAP

FIELD

The subject disclosure generally relates to computers, and, in particular, to automatically swapping users on a computer.

BACKGROUND

A computer may be shared by multiple users. For example, a household computer may be shared by different members of a family. When a user working on the computer leaves the computer, the user may want to prevent another user from accessing personal accounts and/or personal information on the computer. To prevent access to personal accounts and/or personal information, the user may log out of each personal account that is currently open on the computer and/or log off of the computer.

SUMMARY

A computer-implemented method for providing secure access to a computer is disclosed according to one aspect of the subject technology. The method comprises capturing an image with a camera at the computer, extracting facial features from the image, and comparing the extracted facial features with facial features of a user stored on the computer, wherein the computer is currently logged into a user account belonging to the user. The method also comprises, if the extracted facial features match the stored facial features of the user, then staying logged into the user account, and, if the extracted facial features do not match the stored facial features of the user, then automatically logging out of the user account.

A machine-readable medium comprising instructions stored therein is disclosed according to one aspect of the subject technology. The instructions, which when executed by a machine, cause the machine to perform operations for providing secure access to a computer. The operations comprise capturing an image with a camera at the computer, extracting facial features from the image, and comparing the extracted facial features with facial features of a user stored on the computer, wherein the user is currently logged into at least one personal account from the computer. The operations also comprise, if the extracted facial features do not match the stored facial features of the user, then automatically logging out of the at least one personal account.

A system for providing secure access to a computer is disclosed according to one aspect of the subject technology. The system comprises one or more processors, and a machine-readable medium comprising instructions stored therein, which when executed by the one or more processors, cause the one or more processors to perform operations. The operations comprise capturing a first image of a user with a camera at the computer when the user logs into a user account on the computer, and extracting facial features from the first image. The operations also comprise capturing a second image with the camera, extracting facial features from the second image, and comparing the facial features extracted from the first image with the facial features extracted from the second image. The operations further comprise, if the facial features extracted from the first and second images do not match, then automatically logging out of the user account.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
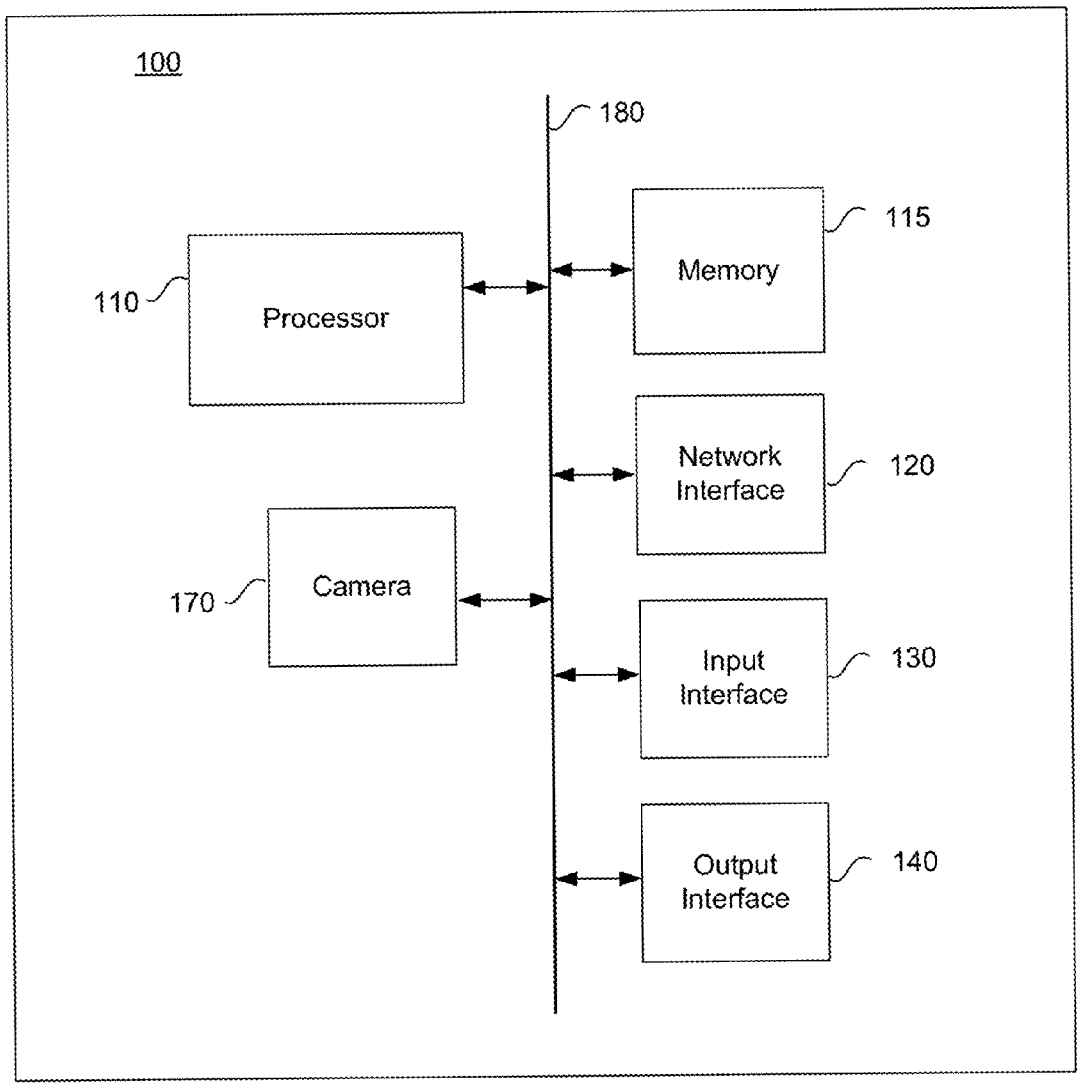
FIG. 1 is a conceptual block diagram of a computer according to an aspect of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

A computer may be shared by multiple users. For example, a household computer may be shared by different members of a family. When a user working on the computer leaves the computer, the user may want to prevent another user from accessing personal accounts and/or personal information on the computer. For example, the computer may be logged into the user's email account and the user does not want the other user to have access to his/her email account. To prevent access to personal accounts, the user may have to log out of each personal account that is currently open on the computer before leaving the computer, which can be cumbersome. The user may also have to log off of the computer to prevent access to personal information (e.g., bookmarks, browser history, login information, etc.) on the computer.

Various aspects of the subject technology address this problem by using facial recognition to detect a user swap (a change in users) at the computer and automatically logging out the previous user upon detecting the user swap. In the present disclosure, logging out a user may include logging out of a user account on the computer linked to personal information of the user and/or logging out of each personal account (e.g., email account) of the user open on the computer.

In one aspect, the computer may include a front-facing camera capable of capturing an image of a user in front of the computer. In this aspect, the computer may capture an image of the user's face with the camera, extract facial features of the user from the image, and store the facial features in memory. The computer may then intermittently capture images with the camera and perform facial recognition on the images using the stored facial features of the user to determine whether the user is still at the computer. The computer may detect a user swap when facial features extracted from an image do not match the stored facial features of the user.

When the computer detects a user swap, the computer may automatically log out the user (e.g., log out of the corresponding user account on the computer and/or log out of each personal account that is currently open on the computer). Thus, the computer automatically prevents access to the user's personal accounts and/or personal information upon detecting the user swap. As a result, the user does not have to manually log out of each personal account and/or manually log off of the computer to prevent access to personal accounts and/or personal information.

FIG. 1 shows a computer 100 according to an aspect of the subject technology. The computer 100 may be a desktop computer, a laptop computer, or other type of computer. While the computer 100 is shown in one configuration in FIG. 1, it is to be understood that the computer 100 may include additional, alternative and/or fewer components.

In the example shown in FIG. 1, the computer 100 includes a processor 110, a memory 115, a network interface 120, an input interface 130, an output interface 140, a camera 170, and a bus 180. The bus 180 collectively represents all system, peripheral, and chipset buses that communicatively connect the numerous components of the computer 100. For instance, the bus 180 communicatively connects the processor 110 with the memory 115. The processor 110 may retrieve instructions from the memory 115 and execute the instructions to implement processes according to various aspects of the subject technology. The processor 110 may comprise a single processor or a multi-core processor in different implementations.

The memory 115 may comprise one or more memory units including non-volatile memory and volatile memory. For example, the memory 115 may include non-volatile memory for storing firmware, an operating system (OS), applications, and/or files. The memory 115 may also include volatile memory (e.g., a random access memory) for storing instructions and data that the processor 110 needs at runtime.

The input interface 130 enables a user to communicate information and commands to the computer 100. For example, the input interface 130 may be coupled to a keyboard and/or a pointing device (e.g., mouse or touch pad) to receive commands from the user. In another example, the input interface 130 may be coupled to a touch screen that receives commands from the user by detecting the presence and location of a user's finger/hand or stylus on the touch screen. The received commands may be sent to the processor 110 for processing.

The output interface 140 may be used to communicate information to the user. For example, the output interface 140 may output information from the processor 110 to the user on a display (e.g., liquid crystal display (LCD)).

The network interface 120 enables the computer 100 to communicate with a network, for example, a local area network ("LAN"), a wide area network ("WAN"), an intranet, the Internet. The network interface 120 may include a wireless communication module for communicating with the network over a wireless link (e.g., WiFi wireless link, cellular wireless link, etc.).

The camera 170 may be configured to capture an image, and may be a front-facing camera configured to capture an image of a user's face. The camera 170 may be implemented using CMOS image sensors, a charge-coupled device (CCD), or other imaging technology.

Figure 2:
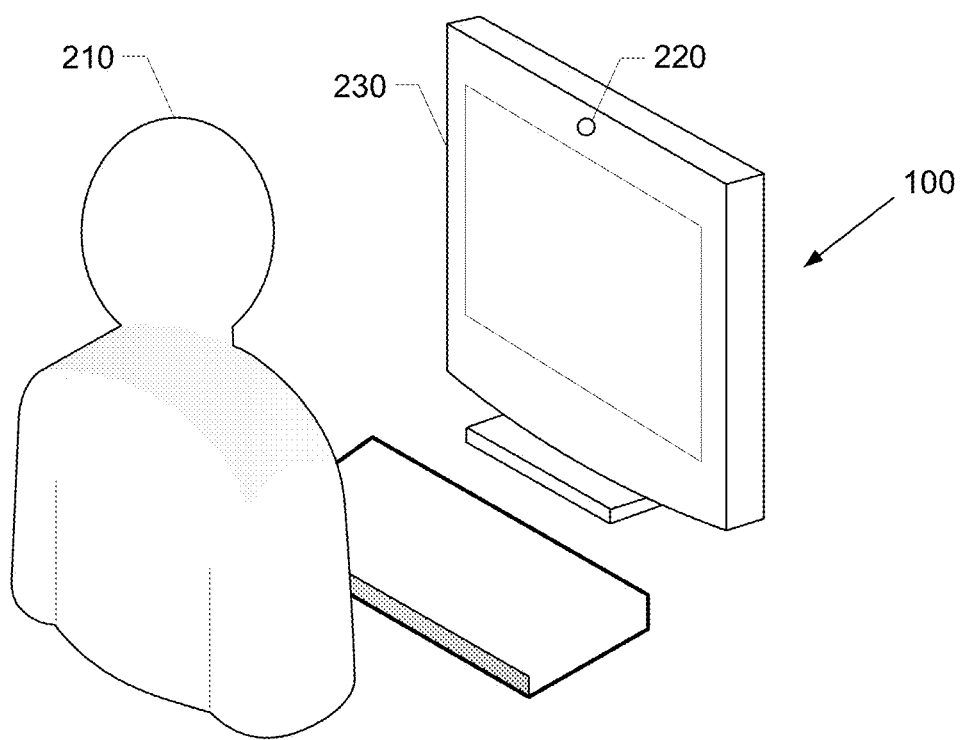
FIG. 2 shows a computer comprising a front-facing camera according to an aspect of the subject technology.

FIG. 2 shows an example of a user 210 working on the computer 100. In this example, the camera 170 comprises a front-facing image sensor 220 that is capable of capturing images of the user's face when the user 210 is facing the computer display 230. The processor 110 may receive an image of the user's face captured with the camera 170 and perform facial recognition on the image to detect whether the user is currently at the computer 100, as discussed further below.

In one aspect, the computer 100 may maintain different user accounts for different users of the computer. For each user account, the computer 100 may store personal information (e.g., bookmarks, browser history, login information, etc.) for the corresponding user in the memory 115. The computer 100 may require a user to log into his/her user account in order to access the corresponding personal information. The user may log into his/her account by entering user credentials (e.g., username and password) into the computer 100. The computer 100 may then determine whether the entered credentials match stored credentials for the user account, and grant access to the user account if there is a match. When the user is done using the computer 100, the user may log out of his/her user account. The user account prevents other users from accessing personal information linked to the user account. This is because a user needs to log into the user account (e.g., provide proper credentials) in order to access the personal information. Also, the different user accounts on the computer 100 keep the personal information for different users separate on the computer 100.

The personal information for a user may include the user's browser history such as addresses (e.g., URLs) of websites visited by the user during one or more browser sessions, a list of URLs typed into the address bar by the user and/or a list of search terms typed into the computer by the user. The personal information may also include personal documents (e.g., a document authored by the user), files, and applications. The personal information may also include user settings such as theme information specifying the look of the desktop, toolbar settings, screen saver settings, security settings, preferred web browser, preferred homepage, etc. The preferred web browser may specify which web browser is used when the user clicks on a web link and the preferred homepage may specify which web page the web browser goes to when the browser is first opened.

The personal information may also include login information for one or more personal accounts (e.g., email account) that are accessible from the computer 100 over a network (e.g., the Internet). For example, when the user logs into a personal account on a website by entering user credentials (e.g., user name and password), the computer 100 may store the credentials for future use. On subsequent visits to the website by the user, the computer 100 may automatically enter the stored user credentials so that the user does not have to reenter the credentials.

The personal information may also include autofill data. For example, when the user enters information (e.g., name, address, phone number, billing information, etc.) into a web form, the computer 100, with the user's permission, may store the entered information as autofill data. When the user has to subsequently fill similar information (e.g., name, address, phone number, etc.) in the same or similar web form, the computer 100 may automatically fill in some or all of the information in the web form using the stored autofill data.

As discussed above, the personal information for a particular user may be linked to the user's account and may only be accessed by logging into the user's account. This prevents other users from accessing the personal information. While the user is logged into his/her user account, any new personal information (e.g., new bookmark entry) that is created by the user and/or computer may be linked to the user account.

While the user is logged into his/her user account on the computer 100, the user may log into one or more personal accounts (e.g., online accounts) from the computer 100. The computer 100 may communicate with a server that controls access to a personal account via the network interface 140. The server may require that it receive proper credentials (e.g., username and password) from the computer 100 over a network in order to grant access to the personal account.

The one or more personal accounts may comprise an email account, an online banking account, a social network account, an online shopping account, an instant messaging account, etc. For example, the user may log into an email account from the computer 100 to view and/or compose emails. In another example, the user may log into an online banking account from the computer 100 to manage a bank account and/or pay bills online. In yet another example, the user may log into a shopping account from the computer 100 to purchase a product online. The user may log into a personal account using a web browser and/or other application on the computer 100.

In one aspect, when the computer 100 is first powered on or a previous user logs off, the computer may display a login screen on the display 230. The login screen may prompt a user currently at the computer 100 to log into a user account. The user may log into his/her user account by entering user credentials (username and password) matching stored user credentials for the account. If the entered credentials match the stored credentials, then the computer 100 may grant the user access to the account. At this time, the computer 100 may capture an image of the user's face with the camera 170, extract facial features of the user from the image, store the extracted facial features in the memory 115, and use the extract facials features to detect when the user has left the computer 100, as discussed further below. The facial features may include the relative position, size and/or shape of the user's eyes, nose, mouth, check bones, jaw line, etc.

Once the user is logged into his/her account, the computer 100 may intermittently capture images with the camera 170, and perform facial recognition on the images using the stored facial features of the user to determine whether the user is still at the computer. The computer 100 may determine that the user is still at the computer when facial features extracted from an image match the stored facial features of the user.

In one aspect, the computer 100 may capture an image with the camera 170 and perform facial recognition periodically. The time interval between image captures may be specified by the user or a default setting on the computer. The use may specify the time interval in a settings menu.

In another aspect, the computer 100 may monitor for user activity (e.g., keyboard inputs, mouse movements, etc.) on the computer 100. In this aspect, the computer may capture an image with the camera 170 and perform facial recognition when the computer 100 does not detect user activity for a certain period of time (e.g., 15 seconds). The time period may be short based on the assumption that when the time interval between user activity detections is short, the same user is actively using the computer 100.

Each time the computer 100 captures an image with the camera 170, the computer 100 may extract facial features from the image and compare the extracted facial features with the stored facial features of the user. The computer 100 may detect a user swap when facial features extracted from an image do match the stored facial features of the user. In this case, the computer 100 may infer that the facial features from the image do not match the stored facial features because another user is front of the computer, and therefore that a user swap has occurred.

When the computer detects a user swap, the computer may automatically log out the user. This may involve logging out of the user account and/or logging out (signing out) of each personal account of the user currently open on the computer 100. Thus, the computer 100 automatically prevents access to the user's personal accounts and/or personal information upon detecting the user swap. As a result, the user does not have to manually log out of each personal account and/or manually log off of the computer 100 to prevent access to personal accounts and/or personal information.

In one aspect, when the computer 100 captures an image with the camera 170, the computer 100 may not be able to extract facial features from the image. This may occur, for example, when the user is facing away from the computer 100 or the user has left the computer 100. When the computer is unable to extract facial features from an image, the computer 100 may lock out and/or display a screen saver. When this occurs, the user may unlock the computer 100 by facing the camera 170 and providing user input to the computer (e.g., by moving a mouse, pressing a key, etc.). Upon detecting the user activity, the computer 100 may capture an image of the user's face with the camera 170 and extract facial features from the image. If the extracted facial features match the stored facial features, then the computer 100 may automatically unlock the computer 100 and allow the user to continue to access the user account. The user may also unlock the computer by manually entering user credentials.

In another aspect, when the computer 100 is unable to extract facial features from an image, the computer 100 may make one or more additional attempts to capture an image of a face before locking out. For example, the computer 100 may capture one or more additional images with the camera 170 after short time intervals (e.g., 10 seconds). If the computer 100 is unable to extract facial features from the one or more additional images, then the computer 100 may lock out. When the computer locks out, the user may unlock the computer 100 by facing the camera 170 and providing user input to the computer 100, as discussed above.

When the computer locks out, the computer 100 may capture an image with the camera 170 upon detecting user activity (e.g., mouse movement, a key being pressed, a touch on a touch pad, etc.). If the camera 170 is unable to extract facial features from the image, then the computer 100 may stay locked out. In this case, the computer may prompt the user to face the camera 170 and/or enter user credentials. If the camera 170 is able to extract facial features from the image and the extracted facial features match the stored facial features of the user, then the computer 100 may automatically unlock the computer 100 and allow the user to continue to access the user account, as discussed above. If the camera 170 is able to extract facial features from the image but the extract facial features do not match the stored facial features of the user because of a user swap, then the computer 100 may automatically log out the user. In this case, the new user may log into his/her user account and/or log in as a guest if the new user does not already have a user account on the computer.

In another aspect, the computer 100 may allow the user to log into his/her user account using facial recognition. In this aspect, facial features of the user may be stored in the memory 115. For example, when the user first sets up the user account, the computer 100 may capture an image of the user's face with the camera 170, extract facial features of the user from the image, and store in the extracted facial features in the memory 115 for subsequent logins.

When the user attempts to log into his/her user account, the computer 100 may capture a new image of the user's face with the camera 170, extract facial features from the new image and compare the facial features from the new image with the stored facial features of the user for a match. If there is a match, then the computer 100 may grant the user access to the user account. In this aspect, the user may log into the computer 100 by simply facing the camera 170 and providing an input to the computer (e.g., by moving a mouse and/or pressing a key on a keyboard). Upon detecting the user activity, the computer 100 may automatically perform the above steps to log the user into his/her user account. An advantage of this aspect is that the user does not have to manually enter user credentials (e.g., username and password) into the computer 100 to log into his/her account. In this aspect, after the user is logged into his/her account, the computer 100 may use the stored facial features of the user to determine whether the user is still at the computer 100, as discussed above.

In one aspect, the computer 100 may lock out when the computer 100 does not detect user activity (e.g., keyboard input, mouse movement, touch on a touch pad, etc.) for a certain period of time (e.g., one minute). After the computer 100 locks out, the user may unlock the computer 100 by facing the camera 170 and providing an input to the computer (e.g., by moving a mouse, pressing a key, etc.). Upon detecting the user activity, the computer 100 may capture an image of the user's face with the camera 170 and perform facial recognition on the image using the stored facial features of the user to determine whether the user is at the computer 100. If the computer 100 determines that the user is at the computer 110, then the computer may unlock and allow the user to continue access to his/her user account. If the computer determines that a new user is at the computer, then the computer may automatically log out the user.

As discussed above, the computer 100 may maintain different user accounts for different users, where each user account may be linked to personal information for the respective user. The personal information for a particular user account may only be accessed when a user is logged into the user account. This prevents unauthorized access to the personal information.

For each user account, the computer 100 may store facial features of the respective user. For example, when each user first sets up a user account, the computer 100 may capture an image of the user with the camera 170, extract facial features of the user from the image, and store the facial features in the memory 115, in which the stored facial features are linked to the user account.

In this aspect, each user may log into his/her account using facial recognition. For example, when the login screen is displayed, a user may face the camera 170 and provide an input to the computer (e.g., by moving a mouse, pressing a key, etc.). Upon detecting the user activity, the computer 100 may capture an image of the user with the camera 170, extract facial features from the image, and compare the extracted facial features with the stored facial features for each user account on the computer 100. If the extracted facial features match the stored facial features for one of the user accounts, then the computer 100 may log into that user account. This advantageously allows users to log into their respective user accounts without having to manually type user credentials. When a user is logged into his/her account, the computer may use the stored facial features of the user to determine whether the user is still at the computer, as discussed above.

The computer 100 may detect a user swap when extracted facial features from an image captured with the camera 170 do not match the facial features of the user logged into the computer. When the computer 100 detects a user swap, the computer 100 may automatically log out the user. The computer 100 may then compare the extracted facial features with the stored facial features for each one of the other user accounts on the computer 100 to determine whether the new user has a user account on the computer. If the extracted facial features match the stored facial features for one of the other user accounts, then the computer 100 may log into that user account.

Thus, when a user swap occurs, the computer 100 may determine whether the new user already has a user account on the computer. If the new user has a user account, then the computer 100 may automatically log the new user into his/her user account. In this case, when a user swap occurs, the computer 100 automatically logs out the previous user and logs in the new user. Once the new user is logged into his/her account, the new user will have access to his/her personal information (e.g., browser history, bookmarks, user settings, etc.) and the personal information of the previous user is blocked from the new user. If the new user does not already have a user account on the computer, then the computer 100 may allow the new user to log in as a guest or deny the new user access to the computer 100.

In one aspect, when a user is logged out, the computer 100 may save current computer state information for the user in the corresponding user account. The computer state information may include information about open tabs, open documents, applications running on the computer, etc. at a time just before the user is logged out. For example, if the user is using a web browser on the computer and has one or more tabs open on the browser, then the computer 100 may store the one or more tabs in the user account as part of the computer state information. The next time the user logs into the user account, the computer 100 may automatically run the browser and open the one or more tabs. This allows the user to continue a browser session from the previous time the user was logged in. For example, if the user is viewing a webpage when the user is logged off the computer 100, then the computer 100 may automatically reopen the webpage the next time the user is logged in so that the user can start where he/she left off.

If the user is logged into one or more personal accounts at the time the user is logged out, then the computer 100 may store information indicating the one or more personal accounts as part of the computer state information. The next time the user logs into the user account, the computer 100 may automatically log into the one or more personal accounts using stored credentials for the personal accounts linked to the user account. Thus, when a user swap occurs, the computer 100 may automatically log out of each of the one or more personal accounts, and when the user is logged back into his/her user account, the computer 100 may automatically log back into the one or more personal accounts. Thus, when the user is logged back into his/her user account, the computer 100 may use the computer state information to restore the computer to the state when the user was last logged into the computer so that the user can start where he/she left off.

A discussed above, while a user is logged into his/her user account, the computer 100 may intermittently capture images with the camera 170 to determine whether the user is still at the computer 100. The computer may capture images periodically, and/or capture an image each time the computer does not detect user activity (e.g., mouse movement, keyboard input, etc.) for certain period of time.

In one aspect, the computer 100 may include a face detect mode, in which the computer determines whether a human face is in front of the computer 100. The computer 100 may do this by capturing an image with the camera 170, and determining whether a human face is present in the image. For example, the computer 100 may examine the image to determine whether there is a cluster of pixels with colors corresponding to the skin tones of a human face and/or an outline of a human face. The computer 100 may also apply a facial recognition algorithm to determine whether basic facial features (e.g., eyes, nose, etc.) of a human face are present in the image. This facial recognition algorithm may be less complex than a facial recognition algorithm used to identify a particular user in an image (e.g., facial recognition algorithm used to detect a user swap). In the face detect mode, the computer 100 may capture lower resolution images with the camera 170. For example, the resolution may be 10 to 50 percent of the resolution used to recognize a particular user. This is because it takes less resolution to recognize a generic human face in an image than to recognize the face of a particular user.

In this aspect, after a user is logged into his/her account on the computer 100, the computer may operate in the face detect mode to determine whether the user has left the computer 100. For example, the computer may periodically capture images at short intervals (e.g., every 5 seconds) with the camera 170 and examine the images to determine whether a human face is present in each image. If the computer is able to detect a human face in each image, then the computer may determine that the user is still at the computer. This may be based on the assumption that, if the computer is able to detect a human face in front of the computer at short time intervals, then the face belongs to the same user. The time interval between image captures may be short enough so that a user swap is not likely to have occurred when the computer detects a face in consecutive images.

If the computer 100 does not detect a human face in an image, then the computer 100 may exit the face detect mode. In this case, the computer 100 may capture one or more subsequent images and apply regular facial recognition to the images to determine whether the user's face is in one or more of the images. If the computer detects the user's face in one or more of the images, then the computer 100 may stay logged into the user account and return to the face detect mode. The computer may temporality fail to detect a face, for example, when the user looks away from the computer and/or temporarily leaves the computer. If the computer does not detect the user's face in one or more of the images, then the computer may lock out and/or log out the user.

In another aspect, the computer 100 may comprise a proximity detector configured to detect whether a user is within a certain distance in front of the computer 100. The proximity detector may detect a user in front of the computer by emitting a signal from an emitter and detecting, with a sensor, a portion of the signal reflected back to the computer 100 from the user. The signal may comprise an ultrasound signal, an infrared signal and/or other signal capable of being reflected off of a user. In this aspect, the emitter may be configured to emit the signal in a direction pointing away from the front of the computer display 230 so that a portion of the signal reflected off of the user is directed back to the front of the computer display 230. Both the emitter and the sensor may be located next to the camera 170 or other location on the front of the computer display 230.

In this aspect, after a user is logged into his/her account on the computer 100, the computer may operate the proximity detector to determine whether the user is still at the computer 100. For example, the computer may have the proximity detector emit a signal continuously or at short intervals (e.g., every 5 seconds) to detect whether the user is within a certain distance (e.g., range of the proximity detector) from the front of the computer. While the proximity detector detects the user in front of the computer 100, the computer 100 may stay logged into the user account. When the proximity detector fails to detect the user (e.g., for a short period of time), the computer may lock out. This may occur, for example, when the user temporarily leaves the computer 100 and/or during a user swap.

After the computer 100 locks out, the user may face the camera 170 and provide an input to the computer (e.g., mouse movement, key press, etc.) to get back in. As discussed above, upon detecting the user activity, the computer may capture an image with the camera 170, extract facial features from the image and determine whether the extracted facial features match stored facial features of the user. If there is a match, then the computer 170 may automatically unlock and allow the user to continue to access his/her user account on the computer.

Alternatively, after the computer 100 locks out, the computer 100 may automatically capture the image for facial recognition when the proximity detector detects the user or another user. This may occur, for example, when the user returns to the computer 100 or a user swap has occurred. In this case, the computer 100 may capture the image and perform facial recognition on the image to determine whether the same user has returned to the computer and/or a user swap has occurred. If the same user has returned, then the computer may automatically unlock the computer and allow the user to continue to access his/her user account on the computer. If a new user is detected, then the computer may determine whether the new user already has a user account on the computer, as discussed above. If new user already has an account, then the computer may automatically log into the user account of the new user.

Figure 3:
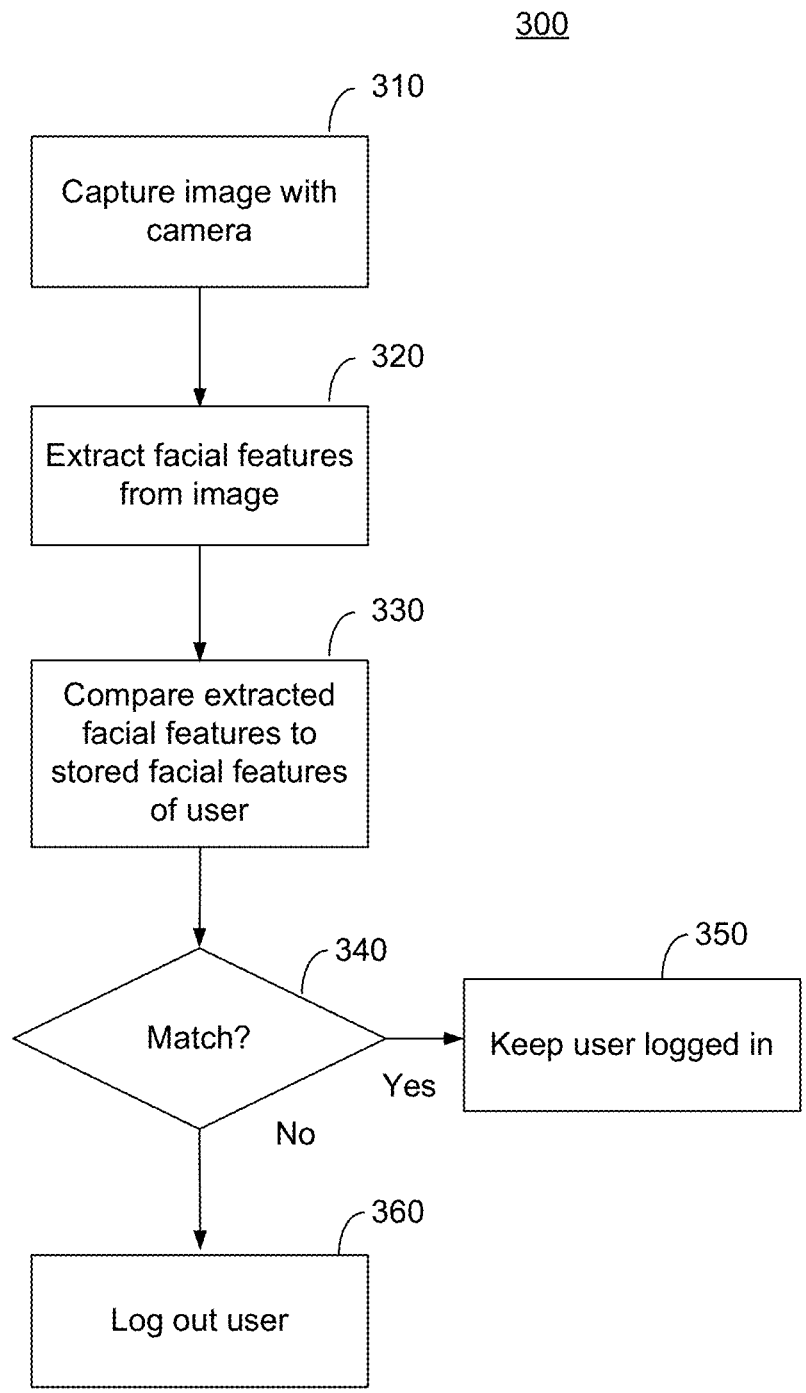
FIG. 3 is a flowchart showing a method for providing secure access to a computer according to an aspect of the subject technology.

FIG. 3 shows a method 300 for providing secure access to a computer according to an aspect of the subject technology.

In step 310, an image is captured from the camera 170. The camera 170 may capture the image periodically, when no user activity is detected at the computer for a certain period of time, and/or when the proximity sensor fails to detect the user near the computer.

In step 320, facial features are extracted from the captured image. In step 330, the extracted facial features are compared to stored facial features of the user. As discussed above, the stored facial features of the user may be extracted from an image taken when the user first logs in or an image from a previous login by the user.

In step 340, a determination is made whether the extracted facial features match the stored facial features of the user. If a match is found, then the method 300 proceeds to step 350 and, if a match is not found, then the method 300 proceeds to step 360.

In step 350, the user is kept logged into the computer 100. This may involve staying logged into a user account of the user on the computer. After step 350, the method 300 may be repeated (e.g., periodically) to confirm that the user is still at the computer 100.

In step 360, the user is logged out of the computer. This may involve logging out of the user account and/or logging out of each open personal account (e.g., online account) of the user currently open on the computer.

Many of the above-described features and applications may be implemented as a set of machine-readable instructions stored on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this disclosure, the term "software" is meant to include firmware or applications stored in a memory, which can be executed by a processor. Also, in some implementations, multiple software aspects can be implemented as sub-parts of a larger program while remaining distinct software aspects. In some implementations, multiple software aspects can also be implemented as separate programs. Finally, any combination of separate programs that together implement a software aspect described here is within the scope of the disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computers and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for providing secure access to a computer, the method comprising:
    capturing a first image of a user with a camera at the computer in response to the user logging into a user account on the computer;
    extracting facial features from the first image;
    periodically detecting, after the capturing of the first image and while the user is still logged into the user account, whether a human face is in front of the computer, by capturing one or more lower-resolution images with the camera;
    capturing, after detecting that the human face is not in front of the computer, a second image with the camera at the computer, wherein the one or more lower-resolution images have a resolution lower than the first and second images;
    extracting facial features from the second image;
    comparing the facial features extracted from the second image with the facial features extracted from the first image;
    if the facial features extracted from the second image match the facial features extracted from the first image, then staying logged into the user account; and
    if the facial features extracted from the second image do not match the facial features extracted from the first image, then automatically logging out of the user account,
    wherein the user is logged into at least one personal account from the computer, wherein the at least one personal account is separate from the user account, and the method further comprises, if the facial features extracted from the second image do not match the facial features extracted from the first image, then automatically logging out of the at least one personal account.

2. The method of claim 1, wherein the at least one personal account comprises at least one of an email account, an online shopping account, an online banking account, and a social network account.

3. The method of claim 1, further comprising storing facial features for each one of a plurality of other user accounts on the computer, and the method further comprises:
    if the facial features extracted from the second image do not match the facial features extracted from the first image, then comparing the facial features extracted from the second image to the stored facial features for each one of the other user accounts; and
    if the facial features extracted from the second image match the stored facial features for one of the other user accounts, then automatically logging into said one of the other user accounts.

4. The method of claim 1, wherein capturing the second image with the camera comprises capturing the second image with the camera when no user activity is detected at the computer for a certain period of time.

5. The method of claim 4, wherein the user activity comprises at least one of a mouse movement, a touch on a touch pad, and a key press on a keyboard.

6. The method of claim 1, further comprising locking out the computer when no user activity is detected at the computer for a certain period of time, wherein capturing the second image with the camera comprises capturing the second image with the camera when user activity is detected after the computer is locked out.

7. The method of claim 6, wherein the user activity comprises at least one of a mouse movement, a touch on a touch pad, and a key press on a keyboard.

8. The method of claim 1, further comprising locking out the computer when a proximity detector does not detect the user within a certain distance from the computer, wherein capturing the second image with the camera comprises capturing the second image with the camera when the proximity detector detects the user or another user after the computer is locked out.

9. A non-transitory machine-readable medium comprising instructions stored therein, which when executed by a machine, cause the machine to perform operations for providing secure access to a computer, the operations comprising:
    capturing a first image of a user with a camera at the computer in response to the user logging into a user account on the computer;
    extracting facial features from the first image;
    periodically detecting, after the capturing of the first image and while the user is still logged into the user account, whether a human face is in front of the computer, by capturing one or more lower-resolution images with the camera;
    capturing, after detecting that the human face is not in front of the computer, a second image with a camera at the computer, wherein the one or more lower-resolution images have a resolution lower than the first and second images;
    extracting facial features from the second image;
    comparing the facial features extracted from the second image with the facial features extracted from the first image;
    if the facial features extracted from the second image do not match the facial features extracted from the first image, then automatically logging out of the user account,
    wherein the user is logged into at least one personal account from the computer, wherein the at least one personal account is separate from the user account, and the operations further comprise, if the facial features extracted from the second image do not match the facial features extracted from the first image, then automatically logging out of the at least one personal account.

10. The non-transitory machine-readable medium of claim 9, wherein the at least one personal account comprises an email account, an online shopping account, an online banking account, and a social network account.

11. The non-transitory machine-readable medium of claim 9, wherein capturing the second image with the camera comprises capturing the second image with the camera when no user activity is detected at the computer for a certain period of time.

12. The non-transitory machine-readable medium of claim 11, wherein the user activity comprises at least one of a mouse movement, a touch on a touch pad, and a key press on a keyboard.

13. The non-transitory machine-readable medium of claim 12, wherein the operations further comprise locking out the computer when no user activity is detected at the computer for a certain period of time, and wherein capturing the second image with the camera comprises capturing the second image with the camera when user activity is detected after the computer is locked out.

14. The non-transitory machine-readable medium of claim 13, wherein the user activity comprises at least one of a mouse movement, a touch on a touch pad, and a key press on a keyboard.

15. The non-transitory machine-readable medium of claim 9, wherein the operations further comprise locking out the computer when a proximity detector does not detect the user within a certain distance from the computer, and wherein capturing the second image with the camera comprises capturing the second image with the camera when the proximity detector detects the user or another user after the computer is locked out.

16. A system for providing secure access to a computer, the system comprising:
    one or more processors; and
    a machine-readable medium comprising instructions stored therein, which when executed by the one or more processors, cause the one or more processors to perform operations comprising:
        capturing a first image of a user with a camera at the computer in response to the user logging into a user account on the computer;
        extracting facial features from the first image;
        periodically detecting, after the capturing of the first image and while the user is still logged into the user account, whether a human face is in front of the computer, by capturing one or more lower-resolution images with the camera;
        capturing, after detecting that the human face is not in front of the computer, a second image with the camera, wherein the one or more lower-resolution images have a resolution lower than the first and second images;
        extracting facial features from the second image;
        comparing the facial features extracted from the first image with the facial features extracted from the second image; and
        if the facial features extracted from the first and second images do not match, then automatically logging out of the user account,
        wherein the user is logged into at least one personal account from the computer, wherein the at least one personal account is separate from the user account, and the operations further comprise, if the facial features extracted from the second image do not match the facial features extracted from the first image, then automatically logging out of the at least one personal account.

17. The system of claim 16, wherein capturing the second image with the camera comprises capturing the second image with the camera when no user activity is detected at the computer for a certain period of time.

18. The system of claim 17, wherein the user activity comprises at least one of a mouse movement, a touch on a touch pad, and a key press on a keyboard.

19. The system of claim 16, wherein the operations further comprise locking out the computer when no user activity is detected at the computer for a certain period of time, and wherein capturing the second image with the camera comprises capturing the second image with the camera when user activity is detected after the computer is locked out.

20. The system of claim 19, wherein the user activity comprises at least one of a mouse movement, a touch on a touch pad, and a key press on a keyboard.

21. The system of claim 16, wherein the operations further comprise locking out the computer when a proximity detector does not detect the user within a certain distance from the computer, and wherein capturing the second image with the camera comprises capturing the second image with the camera when the proximity detector detects the user or another user after the computer is locked out.

* * * * *